Figure 1:
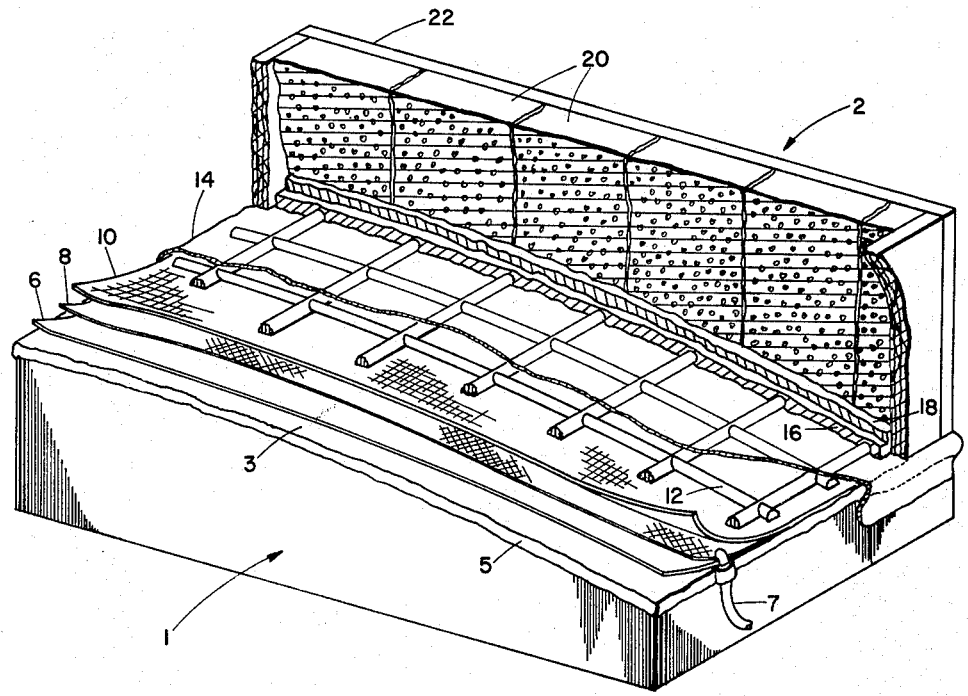

April 20, 1965  A. P. SHULTZ ETAL  3,179,725
METHOD FOR MAKING A DIE
Filed Oct. 7, 1960  4 Sheets-Sheet 1

INVENTOR.
ALVY P. SHULTZ
MICHAEL S. O'NEILL
WILSON D. KERNS
BY
ATTORNEY

April 20, 1965  A. P. SHULTZ ETAL  3,179,725

METHOD FOR MAKING A DIE

Filed Oct. 7, 1960  4 Sheets-Sheet 2

*INVENTORS*
ALVY P SHULTZ
MICHAEL S. O'NEILL
WILSON D. KERNS

BY

ATTORNEY

INVENTORS
ALVY P. SHULTZ
MICHAEL S. O'NEILL
WILSON D. KERNS
BY
ATTORNEY

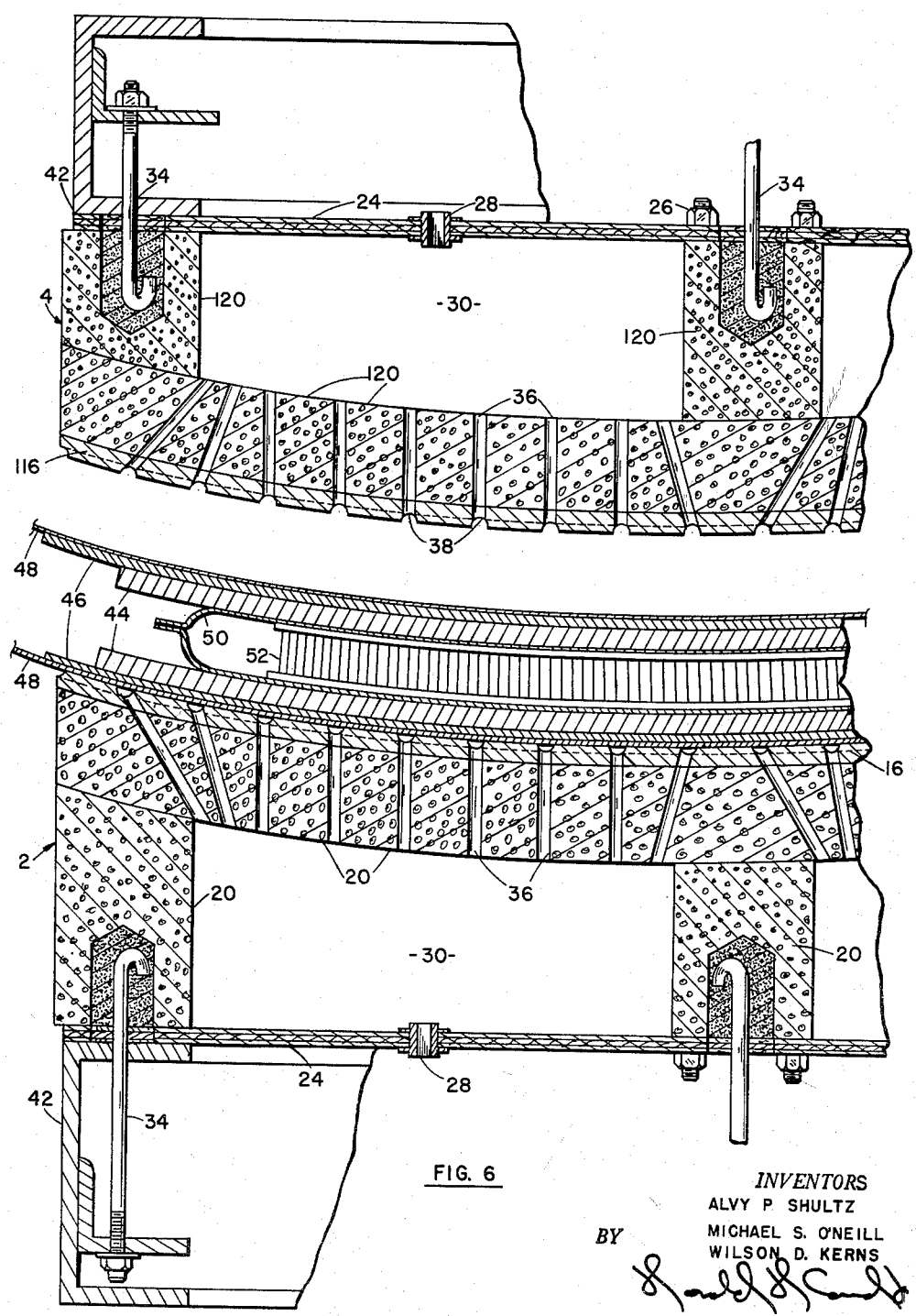

United States Patent Office 3,179,725
Patented Apr. 20, 1965

3,179,725
METHOD FOR MAKING A DIE
Alvy P. Shultz, Hawthorne, Michael S. O'Neill, Anaheim, and Wilson D. Kerns, Playa del Rey, Calif., assignors to North American Aviation, Inc.
Filed Oct. 7, 1960, Ser. No. 61,204
9 Claims. (Cl. 264—90)

This invention pertains to a method for producing dies useful for heating or cooling articles of manufacture such as may be required for brazing, bonding or heat-treating articles while structural support is simultaneously applied thereto. More particularly, this invention relates to a method for producing dies utilized in the production of metallic articles of thin-walled configuration and relatively large size, involving rapid, uniform and closely controlled heating and cooling thereof to avoid the distortion or weakening of material in such articles which would otherwise occur.

Although the dies produced by the method of this invention are of wide applicability in fabricating or heat-treating articles of diverse shapes and materials, they will be described for purposes of illustration in connection with the manufacture of stainless steel sandwich type panels. It will be understood that the scope of the inventive concept is in no sense limited by any of the specific details or illustrative examples used to explain the intention, except as determined by the accompanying claims.

Panels of the type referred to above are useful in various structures including advanced high speed aerial and space vehicles, wherein great structural strength is required at elevated operating temperatures and great precision is necessary in order to assemble component parts. Such panels may comprise two surface sheets of thin stainless steel on the order of .006 inch thickness with a low-density cellular core such as stainless steel foil secured between the two stated sheets. The fabrication of such panels involves separate forming of cellular core material which may take the form of honeycomb material in huge slabs which are cut to size and thereafter joined on each side to the surface sheets of corresponding size. The panels may form fuselage and airfoil surfaces in the finished vehicle, and are of extremely varied and complex form. Depending upon shape and location in the vehicle, a single panel may cover an area as much as 400 square feet.

Different kinds of holding and heating apparatus are known to the prior art for making panels of the foregoing type. However, the initial tooling cost as well as operational and maintenance costs for most such apparatus are relatively high, and where dies are used, the size shape and temperature limitations of such dies make them unsuitable for huge panels of complex curvature. Also, the known die construction materials are generally incapable of withstanding the wide range of temperature variations involved in panel fabrication and heat treatment, especially where temperature shock results from a sudden change from high brazing temperature to sub-zero cooling in the absence of expensive and specialized temperature controlling and distributing apparatus.

Accordingly, it is a principal object of the invention disclosed herein to provide a strong, dimensionally accurate and distortion-free fixture which functions as a brazing heat source, forming die, and heat-treatment apparatus for making light-weight steel panels.

It is another object of this invention to provide improved molds or dies having low coefficient of expansion and high strength and hardness, together with increased resistance to extremes of heat and cold and to thermal shock.

It is a further object of this invention to provide a method for making molds or dies in accordance with the above stated objects which may be practiced with improved ease, economy and rapidity.

It is another object of this invention to provide improved molds or dies as stated in the above objects having great versatility and accuracy in providing finished parts in a wide variety of different shapes or contours having precise dimensions.

Figure 2:
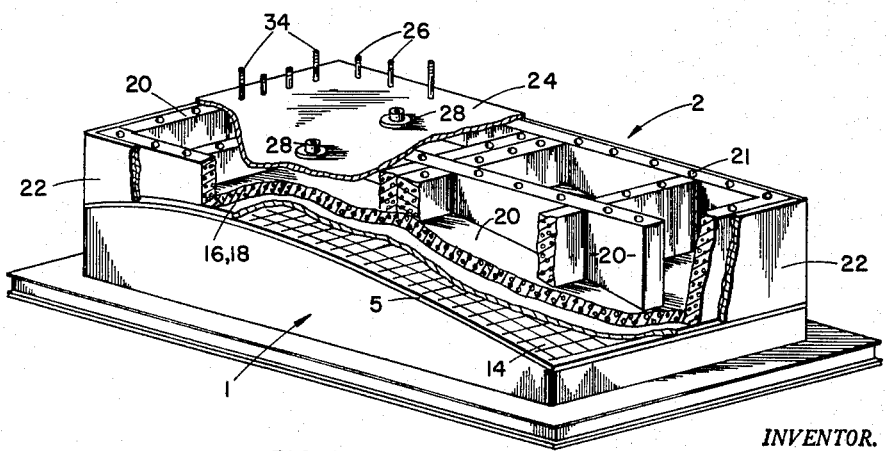
Figure 3:
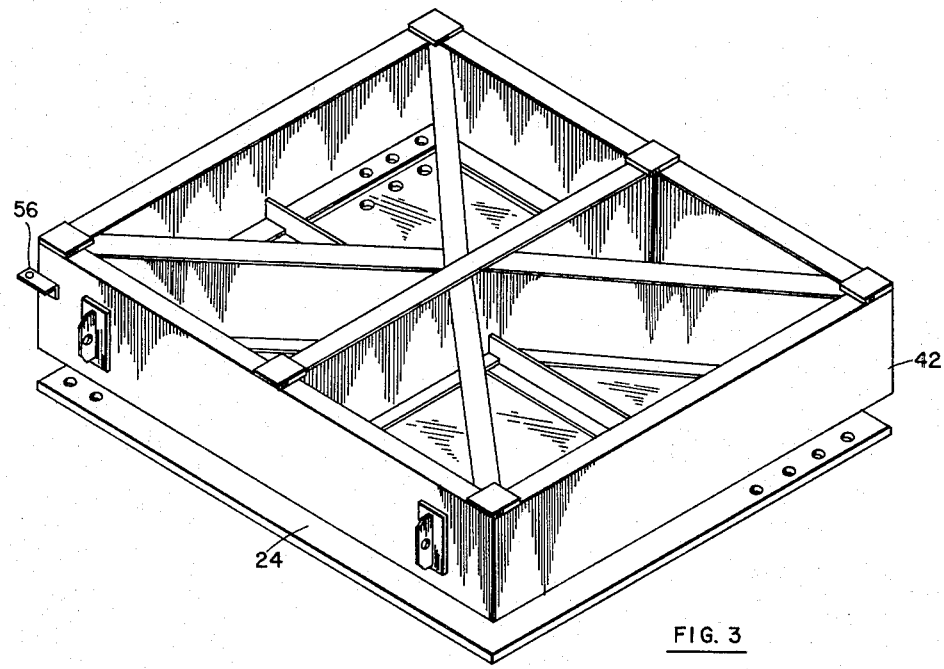
Figure 4:
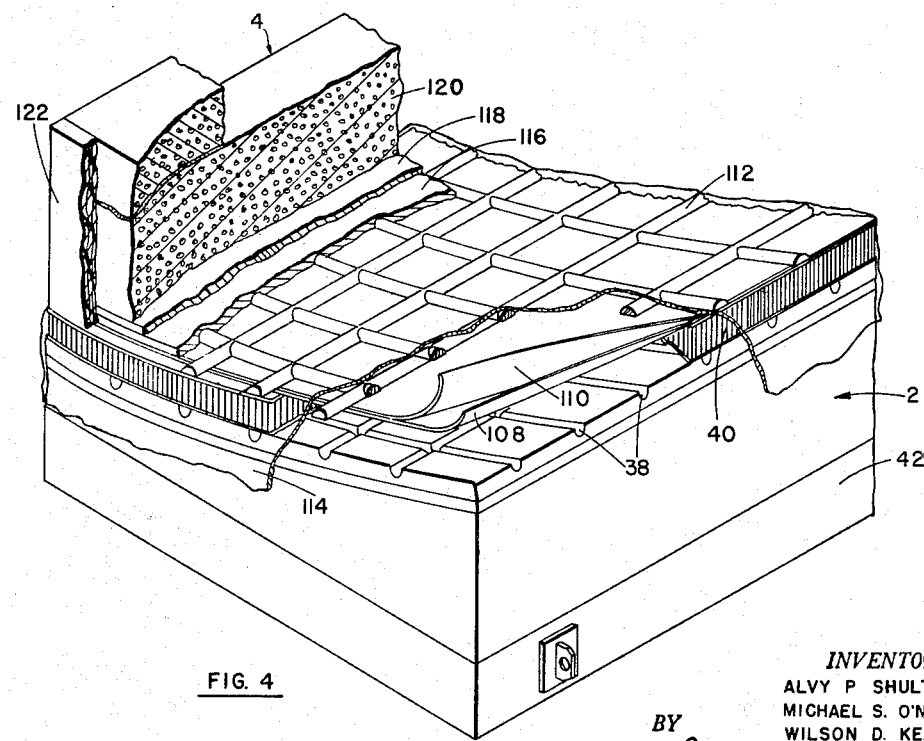
Figure 5:
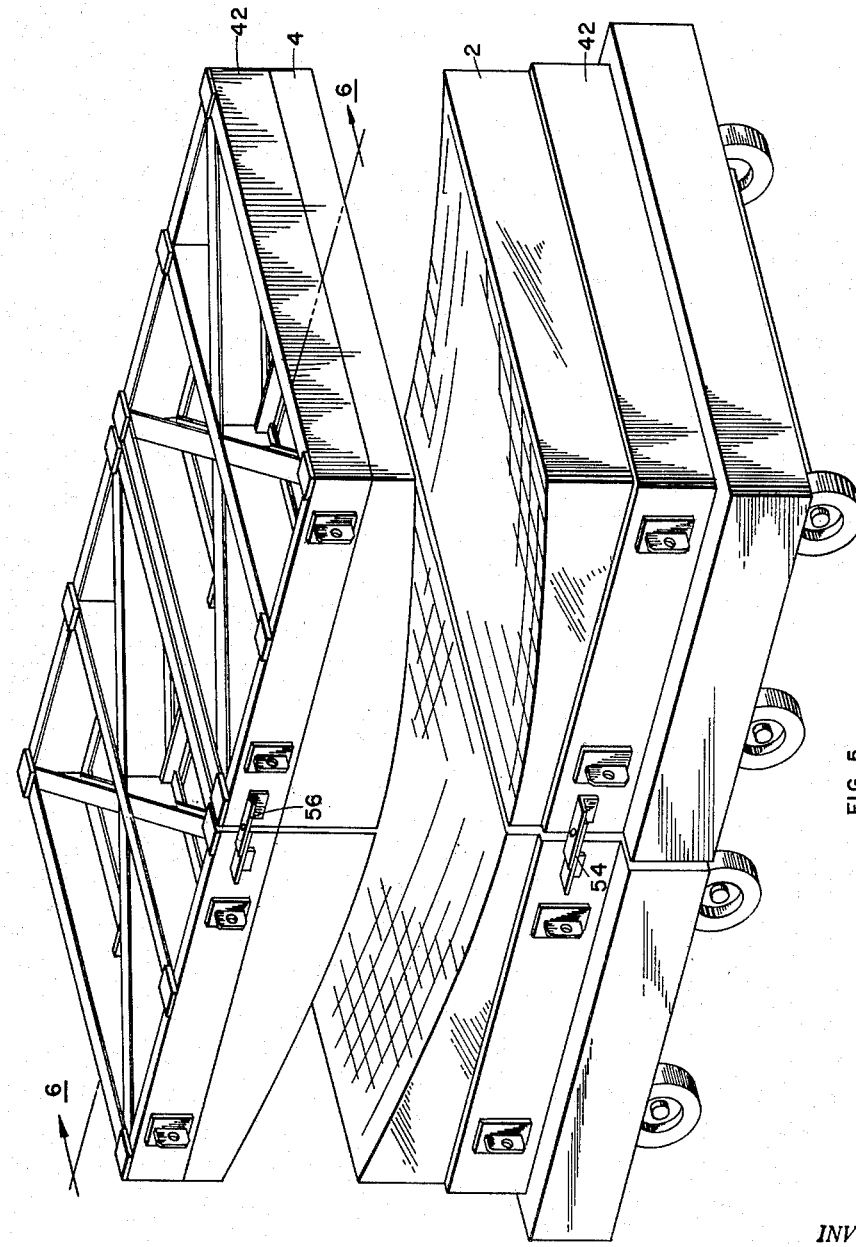

Other objects and advantages will become apparent upon a close reading of the following detailed description of an illustrative embodiment of the inventive concept, reference being had to the accompanying drawings wherein:

FIGURE 1 shows a perspective view partly broken away of a die being assembled in contact with a master model in accordance with the teachings of this invention, FIGURE 2 shows a perspective view partly broken away of the die shown by FIGURE 1 at a later state of its fabrication, FIGURE 3 shows a general perspective view of a steel supporting frame for attachment to the die shown by FIGURE 2, FIGURE 4 shows a perspective view partly broken away of another die being built up on the die shown by FIGURES 1 and 2, FIGURE 5 shows a general perspective view of two dies fabricated as shown by FIGURES 1 through 4 ready for use in fabricating an article of manufacture, and FIGURE 6 shows a cross-sectional view taken through the dies shown by FIGURE 5 and in addition through the article of manufacture and related equipment used in the fabrication thereof.

In essence, the invention consists of a method for producing apparatus comprising a single fixture consisting of two dies which will subsequently be identified as a lower and an upper die, designated by reference numerals 2 and 4, respectively.

With reference to the drawings and particularly to FIGURE 1, it may be seen that fabrication of the apparatus begins with build-up of a first die using a master model 1 which may be fabricated from wood or other suitable material and the surface of which may exactly simulate the contour of the finished article to be produced by the die. The first step in building the stated die may consist of covering the work surface of master model 1 with a coating 3 to smooth the stated surface and to seal pits or cracks therein. Various possible materials known to the prior art may be used for coating 3 such as polyvinyl chloride, which may be applied by brushing or spraying. After drying, coating 3 may then be covered by a tooling blanket 6 which functions to produce the desired shape or curvature of the work face of the die to be built up upon master model 1. As subsequently explained, the article to be formed by the finished dies may be placed within a metallic air-tight envelope with contacting sheets of heat-conducting material on either side thereof and supported thusly between the die work faces. The article formed by the dies using the stated procedure will have external surfaces which differ from the precise contour of the die work faces by an amount depending upon the thickness of the various materials or envelope walls lying intermediate of the article and the faces. The purpose of layer 6 is to provide a reference surface which will alter the work face of the die slightly to compensate for the stated intermediate elements. Thus, the use of blanket 6 will cause the relevant surface of the finished article to duplicate exactly the surface of master model 1 in spite of the stated elements. It will be understood that the inventive concept in this case is not limited to the use of a layer or blanket 6, and that this item may be omitted if not needed, such as when the article to be formed by the dies is not contained within an envelope of the type referred to above, or is otherwise not separated from the die work faces.

When advantageous or necessary, tooling blanket 6 may be included in the build-up procedure, and may be composed of various inert and lightweight plastic or other materials, such as "Styrofoam" polystyrene material, for example. Where layer 6 is formed of porous material or by a plurality of small separate sections arranged on master model 1 with their adjacent edges in close contact, it is also advantageous to provide a layer 8 of relatively stiff, thin and non-porous plastic material in the form of a single large sheet to make a continuous surface without seams such as will aid in applying a vacuum between the layers of material in a manner to be subsequently set forth. In contrast with layer 8, a sheet of flexible and relatively porous material such as fiber glass fabric 10 is overlayed. A grid 12 is then laid over sheet 10, and a thin rubber or vinyl sheet 14 is placed over grid 12. While grid 12 may advantageously take various different forms or be made of many different materials, a relatively flexible plastic such as epoxy is generally well adapted to the purpose, and a rectangular pattern of the type shown in FIGURE 1, for example, produces very satisfactory results.

After the fabrication steps described above have been completed, a vacuum may be applied between sheet 14 and master model 1 by appropriate means to cause closer conformity between sheets 14 and grid 12. For example, a plurality of vacuum lines may be inserted between sheets 8 and 10 around the periphery of master model 1 in the manner of vacuum line 7 shown in FIGURE 1, and sheet 14 may be pulled down at the sides, covering the vacuum line terminal ends. Means for sealing the periphery of sheet 14 to the sides of master model 1 are included in the form of appropriate sealing compound 5 which may consist of zinc chromate. Sealer 5 is applied in a thin strip or bead around master model 1, and securely holds sheet 14 in contact therewith. While the stated vacuum is continuously applied, a layer 16 of paste-like material in the form of moist ceramic cement is troweled or otherwise applied over the entire top surface of sheet 14. Layer 16 may consist of any appropriate ceramic in paste form which, when completely dried or otherwise cured, will produce a strong, hard, stable and chemically inert surface with suitable resistance to rapid and extreme changes of temperature. In the preferred embodiment of the inventive concept disclosed herein, the ceramic known as Glasrock, available from Glasrock Products, Inc., 1101 Glidden Street, N.W., Atlanta 18, Georgia, is considered most suitable in achieving the objects set forth above.

Layer 16 may be allowed to dry completely and is later covered by another layer 18 of moist ceramic cement such as the same material as layer 16. Layer 18 is applied over layer 16 to a shallow depth such as ½ inch in order to provide an adhesive agent for bonding the remaining structure of the die to layer 16 which ultimately will form the working surface of the finished die. Alternatively, layer 16 may serve as a bonding agent if the remaining die structure is secured thereto while layer 16 is still moist. While layer 16 or layer 18 remains moist, depending upon which of the stated alternatives is used, a plurality of light structural members such as porous blocks or bricks 20 of foamed ceramic material are applied over the entire surface of master model 1 in bonded contact with layer 16. Bricks 20 may take the form of expanded Glasrock foam made of the same ceramic material but in slightly different form than that mentioned above in connection with layer 16 and available from the same source. Plywood dikes 22 may be used around the periphery of the master model to facilitate alignment and containment of bricks 20 during build-up of the die on the master model.

As shown by FIGURE 2, for example, a layer of bricks 20 is completely formed over the surface of layer 16 in bonded contact therewith, after which additional bricks may be arranged and cemented to the stated layer of bricks 20 to form partitions 32 which are later covered by plywood to form a plurality of compartments separated by the stated partitions. The exposed upper surfaces of bricks 20 are provided with appropriate means for the attachment of suitable supporting and lifting structure to the finished die, and in the illustrated structure take the form of a plurality of holes 21 in each of which a stud 26 may be cemented or otherwise secured in upwardly projecting relationship. When the die is thus far completed, a sheet metal or plywood covering 24 may be secured to bricks 20 by means of studs 21 to form a plurality of chambers 30 separated by partitions 32. Covering 24 is provided with a plurality of gas inlet fittings 28 arranged to communicate with each of the chambers 30. Heavier studs 34 are also mounted in bricks 20 in the same general manner as studs 21 and provide structural connection by means of which a lightweight steel supporting frame 42 such as shown, for example, in FIGURE 3 may be affixed to the ceramic portion of the die. When the ceramic materials and bonding agents in the die are dry or otherwise completely cured, and frame 42 is securely affixed thereto, the completed die may be lifted off master model 1 by means of the stated frame and inverted to the position shown, for example, by FIGURE 4. Sheet 14 and grid 12 together with related contacting layers described above and used in the build-up of the die on master model 1 may then be peeled or otherwise removed from the surface of the die. It may then be seen that a plurality of grooves 38 corresponding in shape and depth with the intersecting elements of grid 12 are formed in the surface of the die. The number and pattern of grooves 38 may be varied according to the desired distribution of cooling effects from flow occurring in the grooves, while the width and depth of the grooves will depend upon the volume of air or other cooling agent required to cool the mass in a particular specimen within any given period of time. A plurality of holes 36 shown by FIGURE 6, for example, are drilled through the brick layer formed by bricks 20, the stated holes being located at the intersections of the grooves 38 formed in layer 16 by grid 12. Holes 36 are arranged as shown in FIGURE 6 to establish communication between chambers 30 and the working surface of the die to perform a function subsequently to be described. The completed die, designated generally by reference numeral 2 in FIGURE 4 is hereinafter referred to as the lower die to facilitate the remaining explanation of the inventive concept disclosed herein.

With lower die 2 positioned as shown in FIGURE 4, an upper die is formed thereon in a manner generally the same as that used to fabricate lower die 2 on the master model 1. Thus, lower die 2 performs a function in the fabrication of the upper die similar to the function performed by a master model. However, when the completed dies are intended for use with panel type structure such as described above having substantial thickness, means are included in the build-up of the upper die to insure that the working surface of the upper die will provide a finished panel structure having the desired shape or curvature on its supper surface, which may not necessarily coincide with the shape or contour of the working surface of lower die 2. As shown in FIGURE 4 for the sake of illustration, a thickness blank 40 of approximately the same thickness as that desired for the finished honeycomb panel may be placed in contacting relationship upon lower die 2 as shown. Build-up of the upper die may then be undertaken using the upper surface of blank 40 as the reference surface for determining the contour of the working face of the upper die.

Since the upper surface of blank 40 may consist of metal or plastic having sufficient smoothness and other physical properties requisite for the purpose, layers 3 and/or 6 may be omitted as a matter of choice. Accordingly, layer 108 corresponding in function and composition to layer 8 previously described in connection with build-up of lower die 2 may be laid directly upon blank 40. Thereafter, fiber glass sheet 110 together with grid 112 and sheet 114 corresponding respectively to items 10, 12 and 14 previously described are placed in the stated order over layer 8, and ceramic cement layers 116 and 118 are applied in the sequence and manner described above in connection with layers 16 and 18 forming lower die 2. Bricks 120 are thereby bonded to layer 116 in the manner described above to form a plurality of plenum chambers 30 with a covering member thereover and a steel frame secured thereto all in the manner and for the purpose discussed hereinabove for the fabrication of lower die 2.

The completed lower and upper dies 2 and 4, respectively, togeher with their supporting steel frames 42 and 142, ready for use in fabricating an article of panel type such as described above is shown by FIGURE 5. It may be seen from the stated figure that each of the upper and lower dies is formed in a plurality of separate sections rather than by a large single section. Suitable provision is made in the form of overlapping brackets 54 and 56 for connecting the two lower and upper die sections together, respectively. It is obvious that many different variations in shape and size of cooperating dies in addition to those shown by FIGURE 5 may be fabricated by the methods disclosed herein, and any number of separate sections may be thus fabricated individually and later secured together for molding tremendous articles of panel or other type. This feature permits great facility in handling and great flexibility of design in fabricating dies for the manufacture of any articles requiring the application of heat to secure together the component parts thereof or improve the metallic properties of the material therein.

FIGURE 6 shows a cross-sectional view of the dies shown by FIGURE 5 about to be used in the fabrication of a precipitation-hardenable stainless steel panel of honeycomb sandwich type such as described hereinabove. While the panel specimen designated by reference numeral 52 in FIGURE 6 is initially mounted within an air-tight container or retort 50 which may be formed of steel to provide a closed envelope completely containing the specimen therein, the dies disclosed herein may be used for heat-treatment of specimens without such envelope if no such enclosure is useful or necessary. The contacting surfaces between the honeycomb core of panel 52 and the sheet metal surfaces thereof are treated with appropriate brazing agents or bonding compounds and arranged in the desired relationship within retort 50, and an inert gas such as argon may be used to fill retort 50 prior to the application of heat thereto. Suitable heat conducting and distributing means such as copper sheet or strips 44 may be placed in contact with the upper and lower surfaces of retort 50 as shown by FIGURE 6 to aid in the even distribution of heating and cooling effects throughout the surfaces of the retort, although strips 44 may be omitted if their function is adequately performed by making the retort walls of sufficient thickness and of material having good heat-conducting properties. Appropriate heating elements 48 may be used to provide brazing heat by the conversion of electrical energy and are separated from copper elements 44 by an insulating blanket 46 of suitable dielectric material. After the desired amount of heating has been accomplished, the supply of heating current may be terminated, and controlled uniform cooling of specimen 52 may be accomplished by cooling means incorporated into dies 2 and 4 during their fabrication.

The stated cooling means includes a plurality of plenum chambers 30 into which air or gas may be flowed by means of appropriate connections such as inlets 28.

Cooling of specimen 52 is accomplished by the introduction of a suitable relatively low temperature fluid medium from plenum chambers 30 through a plurality of holes 36 leading from the plenum chambers to the work faces of dies 2 and 4. Upon reaching the work faces, the stated medium will contact the surfaces of the article which is supported by the work faces at as many places as there are holes 36.

Since the Glasrock material used in forming dies 2 and 4 as disclosed herein is an excellent heat insulator, and the heating effects of strips 48 on bricks 20 are minimal as stated above, only a small portion of the initial cooling gas flow through plenum chambers 30 and holes 36 is involved in cooling the dies, with the result that cooling of specimen 52 in the stated manner is rapid, immediate, and complete.

From the disclosure set forth herein and illustrated in the drawings it may be seen that this invention provides an improved method and apparatus for the continuous and uninterrupted fabrication and heat treatment of complex articles of thin-walled construction having greater dimensional accuracy and superior physical properties compared to articles of similar nature produced by devices and techniques known to the prior art. The fabrication of dies 2 and 4 as disclosed hereinabove constitutes an extremely inexpensive and versatile method for producing dies for a wide variety of different articles compared to fixtures of similar nature known to the prior art. In addition, the accuracy of dies made in accordance with the method disclosed herein is superior to that achieved by conventional fabrication methods because the lower die in the instant case is formed directly from the master model, and produces as accurate a mold line surface as that of the master model itself, besides which the master facility tool normally required to form a die from a master model is eliminated in the inventive die fabrication method disclosed herein. It is additionally important to the invention disclosed herein that the degree of accuracy thus achieved in respect to the lower die is maintained in the fabrication of the upper die by reason of the fact that the upper die face is cast or molded against the lower die face as a reference surface in the manner of a master model. It is also an advantage of the die fabrication method disclosed herein that either or both of the upper or lower dies may be formed in a plurality of separate sections and used conjointly for molding tremendous articles. Moreover, repair of such dies in their entirety or any portion thereof is a relatively simple matter by use of the materials and methods for die fabrication disclosed herein, since the ceramic cement which initially forms the die face will easily adhere to itself when applied to the die surfaces after fabrication of the face is complete.

While the particular details set forth above and in the drawings are fully capable of attaining the objects and providing the advantages herein stated, the structure and method thus disclosed are merely illustrative and could be varied or modified to produce the same results without departing from the scope of the inventive concept as defined in the appended claims.

We claim:
1. A method of making a die comprising the steps of providing a reference surface to be duplicated in reverse by a work face of said die, covering said reference surface with a flexible plastic grid comprising interesecting straight lines forming rectangular shaped interstices, covering said grid and said reference surface with a hardenable moist ceramic cement in paste-like form, providing additional structural support means secured to said layer of ceramic cement, enclosing the obverse side of said die opposite said work face to form close chamber means, and forming holes through said die communicating said chamber means with said work face.

2. A method of making two cooperating dies of oppositely corresponding shape comprising the steps of providing a reference surface to be duplicated in reverse by a work face of a first die, covering said reference surface with a grid, covering said grid with a flexible sheet, applying over said flexible sheet a layer of hardenable material in paste-like form, allowing said hardenable material to harden, removing said hardened material in a single unitary mass from said reference surface and separating said flexible sheet and said grid from said unitary mass to provide a finished first die, inverting said die to present said work face in an attitude suitable for build-up of a second die thereon, covering said work face of said first die with a material conforming to the shape of said work face, covering said material with a grid, covering said grid and said material with a flexible sheet, applying a layer of hardenable material in paste-like form over said flexible sheet, allowing said hardenable material to harden and form a second die.

3. The method set forth in claim 2 above, including in addition thereto the steps of enclosing the obverse side of said first and said second dies opposite from their work faces to form closed chamber means on each of said first and second dies, and providing holes through said first and said second dies communicating the work face of said first die with the chamber means of said first die and the work face of said second die with the chamber means of said second die.

4. A method of making a die for use in fabricating a specimen, said method comprising the steps of providing a reference surface to be duplicated in reverse by a work face of said die, covering said reference surface with a grid, applying a layer of hardenable material in paste-like form over said grid and said reference surface, allowing said material to harden and thereby form a work face of said die adapted to contact a surface of said specimen, providing additional walls of said hardenable material to form chamber means forming part of said die means on the converse side opposite from said work face for containing a cooling medium, allowing said hardenable material to harden, removing said hardened material in a single unitary mass from said reference surface and said grid exposing groove means in said work face for conducting said cooling medium across said work face, and forming passage means through said die connecting said chamber means to said groove means.

5. A method of making a die comprising the steps of providing a reference surface to be duplicated in reverse by a workface of said die, covering said reference surface with a grid, covering said grid with a flexible sheet of substantially non-porous material, applying a vacuum between said flexible sheet and said reference surface to cause closer conformity of said sheet to the interstices of said grid, applying a layer of hardenable material in paste-like form over said flexible sheet, allowing said material to harden and thereby form said die and removing said hardened material in a single unitary mass from said reference surface, grid and sheet.

6. A method of making a die comprising the steps of providing a reference surface to be duplicated in reverse by a workface of said die, covering said reference surface with a grid, covering said grid with a flexible sheet of relatively non-porous material, applying a layer of hardenable material in paste-like form over said grid and said sheet, allowing said material to harden and thereby form said die, removing said hardened material in a single unitary mass from said reference surface and said grid, and providing holes for the passage of cooling fluid through said die and communicating with said workface.

7. A method of making a die comprising the steps of providing a reference surface to be duplicated in reverse by a workface of said die, covering said reference surface with a grid, applying a layer of hardenable material in paste-like form over said grid and said reference surface, providing additional structural support means joined to said hardenable material for structural reinforcement of the same, allowing said material to harden and thereby form said die, removing said hardened material in a single unitary mass from said reference surface and said grid, forming holes through said workface communicating said workface with the obverse side of said die opposite said workface, and enclosing said obverse side to form enclosed chamber means.

8. A method of making a die comprising the steps of providing a reference surface to be duplicated in reverse by a workface of said die, covering said reference surface with a first sheet of relatively thin and non-porous material, covering said first sheet with a second sheet of flexible, relatively porous material, covering said second sheet with a flexible plastic grid comprising intersecting straight lines forming rectangular shaped interstices, covering said grid with a third sheet of thin rubber-like non-porous material, applying a vacuum between said third sheet and said first sheet to cause closer conformity of said third sheet to the interstices of said grid, applying a layer of hardenable material in paste-like form over said third sheet, allowing said material to harden and thereby form said die, and removing said hardened material in a single unitary mass from said reference surface.

9. The method set forth in claim 8 above wherein said second sheet is glass fiber cloth.

References Cited by the Examiner
UNITED STATES PATENTS

| | | | |
|---|---|---|---|
| 380,099 | 3/88 | Duncan | 18—44 |
| 1,571,849 | 2/26 | Long | 18—61 |
| 1,868,788 | 7/32 | Zinser | 18—47 |
| 2,162,229 | 6/39 | Remington | 148—127 |
| 2,206,812 | 7/40 | Fitzgerald et al. | |
| 2,264,004 | 11/41 | Patterson et al. | 148—127 |
| 2,388,528 | 11/45 | Curtiss | 76—107 |
| 2,447,620 | 8/48 | Singleton et al. | 76—107 |
| 2,652,595 | 9/53 | Kish. | |
| 2,763,049 | 9/56 | Peebles | 18—47 |
| 2,768,595 | 10/56 | Kalbow et al. | 113—98 |
| 2,824,535 | 2/58 | Kalbow et al. | 113—98 |

ALEXANDER H. BRODMERKEL, *Primary Examiner.*
JOHN C. CHRISTIE, WILLIAM J. STEPHENSON, *Examiners.*